3,592,843
PURIFICATION OF L-DOPA
Arnold Brossi, Verona, John Edward Heveran, Fairfield, Edward Arthur MacMullan, Edison, and Bernard Zigmund Senkowski, Bloomfield, N.J., assignors to Hoffmann-La Roche Inc., Nutley, N.J.
No Drawing. Filed Jan. 31, 1969, Ser. No. 795,728
Int. Cl. C07c *101/72*
U.S. Cl. 260—519     20 Claims

ABSTRACT OF THE DISCLOSURE

The present invention relates to a process for the optical and chemical purification of L-Dopa by dissolving the impurities in a solvent mixture containing either methanol or ethanol and water and by crystallization, in the presence of ascorbic acid.

BACKGROUND OF THE INVENTION

Dopa which has the formula:

(D, L)

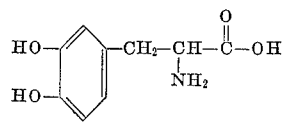

has been known for many years to be an intermediate in the biological pathway from tyrosine to epinephrine. Quite recently, L-Dopa, the L-enantiomorph of the racemate of Dopa, has been found to be a remarkably effective therapeutic agent in the treatment of Parkinson's Disease. Until this finding, sufferers of Parkinson's Disease relied only upon hit or miss symptomatic drug therapy or on surgical procedures in the hope of relief from the effects of this disease. Unfortunately, neither symptomatic drug therapy nor surgical procedures generally resulted in more than a temporary retardation from the effects of this serious malady. The art has long recognized the pressing need for a medicament which would serve to control this chronic disease. However, the recent finding that L-Dopa is effective in the treatment of Parkinson's Disease has buoyed the hope of many.

In order to obtain the maximum beneficial effects of L-Dopa as medicament in the treating of Parkinson's Disease, the L-Dopa should be both chemically and optically as pure as possible. In view of the need for the repeated use of this compound in relatively high doses to treat Parkinson's Disease, even small amounts of chemical impurities and the undesired D-enantiomorph in the L-Dopa product could cause undersirable side effects. In view of this, L-Dopa suitable for treating Parkinson's Disease is in short supply.

The L-Dopa that is made by known processes often contains chemical impurities entrained therein such as small amounts of alkanols, metal salts, etc., as well as the undesired D-Dopa enantiomorph and other solvents. These small amounts of chemical and optical impurities which become entrained in the L-Dopa are exceedingly difficult to separate. Furthermore, many of the conventional purification techniques decompose and discolor the L-Dopa. Therefore, it has been very difficult to produce L-Dopa in a substantially pure state without any chemical or optical impurities. In view of the very nature of Parkinson's Disease, there is an urgent desire to provide a simple and economic means for producing substantially pure L-Dopa.

SUMMARY OF THE INVENTION

In accordance with this invention, it has been found that both of the chemical and optical impurities can be removed from crude crystalline L-Dopa by mixing the crude material into a solvent mixture containing from about 40 percent to 60 percent by volume of either methanol or ethanol and form 40 percent to 60 percent by volume of water, so that the undesired optical impurity, i.e., the D-enantiomorph of L-Dopa, is dissolved in the solvent mixture and by dissolving the L-Dopa in water at a temperature of at least 80° C. containing ascorbic acid and crystallizing the L-Dopa from the solution so that all of the chemical impurities remain in said solution.

By the above process, a simple and economic means is provided which can be utilized to produce L-Dopa in the substantially pure form desired for use in treating Parkinson's Disease. The process of this invention provides a simple and economic method for removing the optical impurity, i.e., the undesired D-Dopa enantiomorph, and all chemical impurities such as entrained alcohols and other solvents, metal salts, etc., to provide L-Dopa in the purified state siutable for medicinal use with any discoloration or decomposition of the L-Dopa.

DETAILED DESCRIPTION OF THE INVENTION

L-Dopa, which is commonly produced by conventional processes, contains both optical and chemical impurities which make it unsuitable for medicinal use. Generally, the L-Dopa produced by certain conventional procedures contains from about 0.5 percent to about 5 percent by weight of chemical impurities entrained therein and from about 1.5 percent to 2.5 percent by weight of the undesired D-enantiomorph. The chemical impurities are generally unreacted starting material, alcohols and other solvents, metal salts such as sodium carbonate, etc., and the optical impurity is the D-Dopa enantiomorph.

The crystallization procedure of this invention wherein crude L-Dopa is first dissolved in water at a temperature of at least 80° C. containing ascorbic acid, then crystallized from this solution and thereafter separated from this solution, removes all of the chemical impurities from the L-Dopa to provide L-Dopa free from any detectable chemical impurities. The solvent procedure wherein crude L-Dopa is mixed in a solvent mixture containing from about 40 percent to 60 percent by volume of their methanol or ethanol and from 40 to 60 percent by volume of water removes all of the undesired D-enantiomorph by selectively dissolving the D-enantiomorph. This solvent procedure produces crystalline L-Dopa without any detectable optical impurity. Furthermore, the aforementioned solvent technique will remove chemical impurities such as the chemical impurities hereinbefore mentioned. In accordance with this invention, the solvent procedure or the crystallization procedure can be carried out in any order. In accordance with a preferred process of this invention, the crude L-Dopa is first subjected to the solvent mixture to remove the D-enantiomorph and then subjected to crystallization to remove chemical impurities.

The process of this invention can be utilized for removing D-Dopa from L-Dopa wherein the D-Dopa is present as an impurity in an amount of as high as about 18 percent by weight. Furthermore, the D-Dopa can be removed from the L-Dopa by the process of this invention wherein the D-Dopa is present in amounts as low as about 0.3 percent by weight of the L-Dopa. Generally, is preferred to purify, in accordance with this invention, L-Dopa which contains from about 0.8 percent to about 5 percent by weight of the undesired D-enantiomorph. The process of this invention provides a means for substantially removing all of the undesired D-Dopa enantiomorph from L-Dopa to produce L-Dopa containing no detectable D-Dopa.

In carrying out this invention, the L-Dopa containing the D-Dopa as an impurity is first mixed into a solvent mixture of alcohol and water wherein the alcohol is either ethyl or methyl alcohol. In order to achieve the beneficial results of this invention, the alcohol water solvent mixture should contain from about 40 to 60 percent by weight of water and from about 40 to 60 percent by weight of the alcohol. If alcohols other than methanol or ethanol are utilized or if a greater or lesser amount of the alcohol is utilized than that specified above, the beneficial results of this process are not obtained. Generally, the solvent mixture should consist only of water and the aforementioned alcohols. This mixing step is preferably carried out at room temperature. However, the mixing step can be carried out at any temperature from about 10° C. to about 40° C.

In accordance with this invention, the L-Dopa to be purified should be mixed with the solvent mixture in a ratio of from about 2 g. to about 80 g. of the L-Dopa to be purified to about 1 liter of the solvent mixture. Generally, it is preferred to mix the L-Dopa to be purified with the solvent mixture in a ratio of from about 30 g. to about 60 g. of L-Dopa per liter of solvent. In order to remove the optical impurities present in L-Dopa, the mixing step should be carried out for a period of at least 10 hours to insure dissolution of the impurities into the solvent mixture. If desired, the mixing can take place for 6 days or longer. However, since such long mixing times do not provide any additional beneficial results, these long mixing times are seldom utilized. Generally, it is preferred to mix the L-Dopa to be purified into the solvent mixture for a period of from about 40 hours to about 60 hours.

After the mixing is completed and the optical impurities are dissolved in the solvent mixture, the substantially optically pure L-Dopa can be separated from the solvent mixture by any conventional means. Decantation, filtration, and centrifugation are among the conventional means that can be utilized to separate the optically pure crystalline L-Dopa from the solvent mixture in accordance with this invention. The optically pure crystalline L-Dopa that is obtained is substantially free of any undesired D-enantiomorph.

If it is desired to wash and dry the optically pure crystalline L-Dopa separated from the solvent mixture, the washing step can be carried out by utilizing the same solvent mixture as utilized in the purification step at a temperature of from about 5° C. to 30° C. As far as the drying step is concerned, any conventional means of drying can be utilized so long as the temperature is not above 100° C. Generally, it is preferred to utilize vacuum in carrying out the drying step.

The crystalline L-Dopa which is to be chemically purified in accordance with the process of this invention can contain from about 0.06 percent to about 5 percent by weight of chemical impurities entrained therein. Generally, the crystalline L-Dopa that is to be purified in accordance with the process of this invention contains from about 0.5 percent to about 1.5 percent by weight of chemical impurities entrained therein. This process can purify L-Dopa having a chemical purity of 95 percent or greater, i.e., a chemical purity of 99.94 percent by weight, to produce L-Dopa of a chemical purity of about 100 percent by weight.

In accordance with the process of this invention, the crude crystalline L-Dopa is dissolved in water having a temperature of at least 80° C. Generally, it is preferred that the water utilized to dissolve the L-Dopa be at the boiling temperature during this step of the process. In carrying out this step, the water should be present in an amount sufficient to dissolve all of the crude crystalline L-Dopa desired to be purified. If desired, large excesses of water may be present without deleteriously effecting the purification process of this invention.

In accordance with this invention, ascorbic acid is present in the water prior to dissolving the crude crystalline L-Dopa therein. The ascorbic acid should be present in the aqueous solution in an amount of from about 0.1 percent to about 10 percent by weight, based upon the weight of the crystalline L-Dopa desired to be purified. Generally, it is preferred to utilize the ascorbic acid in an amount of from about 0.8 percent to about 2 percent by weight based upon the weight of the L-Dopa in the solution.

After the aqueous solution is formed containing the crude L-Dopa and ascorbic acid, the solution can be filtered while it is maintained at a temperature of at least 80° C. to remove any undissolved solids. If there are no undissolved solids in the solution that is formed, this step can be omitted. After a solution containing L-Dopa and ascorbic acid is formed which has no undissolved solids, the L-Dopa can be crystallized from the solution by any conventional means such as cooling. By means of crystallization through the use of an aqueous solution containing ascorbic acid, the L-Dopa is produced in crystalline form having a purity of approximately 100 percent with the difficultly separable impurities such as metal salts, alcohols and unreacted starting materials remaining in the aqueous solution.

Generally, it is preferred to carry out the crystallization step under an inert atmosphere by cooling the aqueous solution to room temperature. Any inert gas such as nitrogen can be utilized to provide the inert atmosphere if desired.

After the L-Dopa is crystallized from the aqueous solution containing ascorbic acid, the pure crystalline L-Dopa having a chemical purity of about 100 percent is separated from the solution. Any conventional means of separation can be utilized to recover this chemically pure crystalline L-Dopa. Decantation, filtration and centrifugation are among the conventional means that can be utilized for separating the chemically pure crystalline L-Dopa from the mother liquor in accordance with this invention.

If it is desired to wash and dry the chemically pure crystalline L-Dopa separated from the aqueous solution containing ascorbic acid, the washing step should be carried out by utilizing water at a temperature of from about 5° C. to 30° C. As far as the drying step is concerned, any conventional means of drying can be utilized so long as the temperature is not above 100° C. Generally, it is preferred to utilize vacuum in carrying out the drying step.

It is understood that the following examples are representative and not limitative of the foregoing invention. The 100 percent purity reported in the examples is within the precision limits of the procedures for ascertaining absolute purity.

EXAMPLE 1

L-Dopa (10 g.) containing about 1 percent by weight of methanol (determined by gas chromatography) and slightly discolored was dissolved in 405 ml. of boiling water containing 100 mg. of ascorbic acid. The clear solution was cooled to room temperature and the resulting slurry of crystals was refrigerated for 20 hours. This procedure was carried out under nitrogen. The crystals of L-Dopa were filtered, washed with 30 ml. of ice water and dried in vacuo in the presence of phosphorus pentoxide, first at room temperature and then at 70° C. 8.7 g. of 100 percent pure white L-Dopa was produced. This product was about 100 percent pure containing 0.0 percent of methanol as determined by gas chromatography.

EXAMPLE 2

9.3 g. of L-Dopa containing about 0.7 percent by weight of metal salt was dissolved into 360 ml. of boiling water containing 100 mg. of ascorbic acid. The clear solution was cooled to room temperature and the resulting slurry of crystals was refrigerated for 20 hours. The entire operation was carried out under nitrogen. The crystals of L-Dopa were filtered, washed with 30 ml. of ice water and dried in vacuo in the presence of phosphorus pentoxide, first at room temperature and then at 70° C. 8.5 g. of product was obtained. This product was 100 percent pure, as determined by gas chromatography. This product was free of the metal salt as determined by combusting a small sample.

EXAMPLE 3

L-Dopa (5 g.) containing 2.1 percent by weight of D-Dopa (as determined by phase solubility, optical rotation, and thin layer chromatography) was stirred at room temperature for 2 days with 100 ml. of 1 to 1 by volume methanol-water solvent mixture. After this, the solid was filtered, washed with a small quantity of this solvent mixture and dried in vacuo at 50–60° C. providing 4.5 g. of crystalline L-Dopa. This product had a purity of 100 percent with 0.0 percent of the D-Dopa as determined by phase solubility, optical rotation and thin layer chromatography.

EXAMPLE 4

L-Dopa (5 g.) containing 2.1 percent by weight of D-Dopa (as determined by phase solubility, optical rotation, and thin layer chromatography) was stirred at room temperature for 2 days with 100 ml. of 1 to 1 volume ethanol-water mixture. After this, the solid was filtered, washed with a small quantity of this solvent, and dried in vacuo at 50–60° C. providing 4.5 g. of crystalline L-Dopa. This product had a purity of about 100 percent with 0.0 percent of D-Dopa as determined by phase solubility, optical rotation, and thin layer chromatography.

EXAMPLE 5

L-Dopa (10 g.) containing about 1 percent by weight of methanol (determined by gas chromatography), 0.7 percent by weight of metal salt and slightly discolored was dissolved in 415 ml. of boiling water containing 120 mg. of ascorbic acid. The clear solution was cooled to room temperature and the resulting slurry of crystals was refrigerated for 20 hours. This procedure was carried out under nitrogen. The crystals of L-Dopa were filtered, washed with 30 ml. of ice water and dried in vacuo in the presence of phosphorus pentoxide, first at room temperature and then at 70° C. 8 g. of 100 percent pure white L-Dopa was produced. This product was about 100 percent pure containing 0.0 percent of methanol and 0.0 by weight of metal salt as determined by gas chromatography and by combusting a small sample.

EXAMPLE 6

L-Dopa (10 g.) containing 2.1 percent by weight of D-Dopa (as determined by phase solubility, optical rotation, and thin layer chromatography), 0.7 percent by weight of metal salt and 1 percent by weight of methanol (as determined by gas chromatography) was stirred at room temperature for 2 days with 100 ml. of 1 to 1 volume methanol-water mixture. After this, the solid was filtered, washed with a small quantity of this solvent, and dried in vacuo at 50–60° C. providing 7.5 g. of crystalline L-Dopa. This dried crystalline product was dissolved with 360 ml. of boiling water containing 100 mg. of ascorbic acid. The resulting clear solution was cooled to room temperature and the resulting slurry of crystals was refrigerated for 20 hours. The entire operation was carried out under nitrogen. The crystals of L-Dopa were filtered, washed with 30 ml. of ice water and dried in vacuo in the presence of phosphorus pentoxide, first at room temperature and then at 70° C. 6 g. of crystalline L-Dopa was obtained as product. This product was substantially 100 percent pure and contained 0.0 percent by weight of D-Dopa (as determined by phase solubility, optical rotation and thin layer chromatography), 0.0 percent by weight of methanol (as determined by gas chromatography) and 0.0 percent by weight of metal salt (as determined by combusting a small sample).

What is claimed is:

1. A process for producing chemically pure crystalline L-Dopa comprising:
    (a) providing an aqueous solution containing L-Dopa and ascorbic acid at a temperature of at least 80° C. wherein said aqueous solution is formed by dissolving crude crystalline L-Dopa having chemical impurities entrained therein in water at a temperature of at least 80° C., and
    (b) crystallizing L-Dopa from said aqueous solution to produce crystalline L-Dopa substantially free from all chemical impurities.

2. The process of claim 1 wherein said aqueous solution is formed by dissolving the crystalline L-Dopa in water at the boiling temperature of the water.

3. The process of claim 1 wherein the ascorbic acid is present in said solution in an amount of from about 0.1% to about 10% by weight of said crystalline L-Dopa dissolved in said aqueous solution.

4. The process of claim 3 wherein said ascorbic acid is present in said solution in an amount of from about 0.8% to 2% by weight, based upon the weight of the ascorbic acid dissolved in said solution.

5. The process of claim 1 wherein said crystallization is carried out by cooling said solution under an inert atmosphere.

6. The process of claim 1 wherein crude L-Dopa contains from about 0.06 to about 5% by weight of chemical impurities.

7. The process of claim 6 wherein the ascorbic acid is present in said solution in an amount of from about 0.1% to about 10% by weight of said crystalline L-Dopa dissolved in said aqueous solution.

8. A process for producing L-Dopa substantially free of any D-Dopa comprising:
    (a) mixing crystalline L-Dopa containing at most 18% by weight of D-Dopa as an impurity into a solvent mixture comprising from about 40 to 60% by volume of water and from 40 to 60% by volume of methanol or ethanol to dissolve all of the D-Dopa impurity contained within said L-Dopa; and
    (b) separating said L-Dopa from said solvent mixture to obtain L-Dopa as a crystalline material substantially free of any undesired D-Dopa.

9. The process of claim 8 wherein said solvent mixture contains from about 50% by volume of methanol and from about 50% by volume of water.

10. The process of claim 8 wherein the L-Dopa is mixed with said solvent mixture in an amount of from about 2 g. to about 80 g. of L-Dopa per liter of said solvent mixture.

11. The process of claim 8 wherein the mixing step is carried out for a period of at least 10 hours.

12. The process of claim 8 wherein the D-Dopa is present as an impurity in the L-Dopa in an amount of from about 0.3% to about 18% by weight.

13. A process for producing chemically and optically pure crystalline L-Dopa comprising:
    (a) mixing crude L-Dopa containing chemical impurities entrained therein and containing at most 18% by wegiht of D-Dopa as an impurity into a solvent mixture comprising from about 40% to about 60% by volume of methanol or ethanol and from about 40% to 60% by volume of water to dissolve all of the D-Dopa impurity contained within said L-Dopa;
    (b) separating said L-Dopa from said solvent mixture to obtain L-Dopa as a crystalline material substantially free of D-Dopa;
    (c) dissolving said L-Dopa substantially free of D-Dopa in an aqueous solution containing ascorbic acid at a temperature of at least 80° C.; and
    (d) crystallizing L-Dopa from said aqueous solution to produce crystalline L-Dopa substantially free from all chemical and optical impurities.

14. The process of claim 13 wherein the L-Dopa in step (a) is mixed with said solvent mixture in an amount from about 2 g. to about 80 g. of L-Dopa per liter of said solvent mixture.

15. The process of claim 13 wherein said solvent mixture in step (a) contains from about 50% by volume of methanol and from about 50% by volume of water.

16. The process of claim 13 wherein ascorbic acid in step (c) is present in said solution in an amount of from about 0.1% to about 10% by weight of said crystalline L-Dopa dissolved in said aqueous solution.

17. A process for producing chemically and optically pure crystalline L-Dopa comprising:
   (a) dissolving crude L-Dopa containing chemical impurities entrained therein and containing at most 18% by weight of D-Dopa as an impurity into an aqueous solution containing ascorbic acid at a temperature of at least 80° C.;
   (b) crystallizing L-Dopa from said aqueous solution to produce crystalline L-Dopa substantially free from all chemical impurities;
   (c) mixing said L-Dopa which is substantially free from all chemical impurities into a solvent mixture comprising from about 40% to 60% by volume of methanol or ethanol and from about 40% to 60% by volume of water to dissolve all of the D-Dopa impurity contained within said L-Dopa; and
   (d) separating said L-Dopa from said solvent mixture to obtain L-Dopa as a crystalline material substantially free from any chemical impurities and substantially free of any undesired D-Dopa.

18. The process of claim 17 wherein the L-Dopa in step (c) is mixed with said solvent mixture in an amount of from about 2 g. to about 80 g. of L-Dopa per liter of said solvent mixture.

19. The process of claim 17 wherein said solvent mixture in step (c) contains from about 50% by volume of methanol and from about 50% by volume of water.

20. The process of claim 17 wherein ascorbic acid in step (a) is present in said solution in an amount of from about 0.1% to about 10% by weight of said crystalline L-Dopa dissolved in said aqueous solution.

References Cited

UNITED STATES PATENTS 3,505,385    4/1970    Reinhold et al. _____ 260—519

LEWIS GOTTS, Primary Examiner

L. A. THAXTON, Assistant Examiner

U.S. Cl. X.R.

260—999